United States Patent [19]
Burckhartzmeyer et al.

[11] Patent Number: 5,749,423
[45] Date of Patent: May 12, 1998

[54] BELTED WORK MACHINE

[75] Inventors: Jerry J. Burckhartzmeyer, Peoria; Elmer R. Crabb, Aurora, both of Ill.; Terry F. Lehnhoff, Vichy, Mo.; Alva L. Watson, Jr., Pekin, Ill.

[73] Assignee: Caterpillar Inc., Peoria, Ill.

[21] Appl. No.: 532,441

[22] Filed: Sep. 22, 1995

[51] Int. Cl.$^6$ ................................... B62D 55/14
[52] U.S. Cl. ................... 180/9.54; 305/125; 305/132; 305/139
[58] Field of Search ............... 180/9, 9.1, 9.54; 305/120, 121, 124, 125, 126, 129, 132, 133, 139

[56] References Cited

U.S. PATENT DOCUMENTS

| | | | |
|---|---|---|---|
| 2,041,599 | 5/1936 | Fergusson | 305/125 |
| 2,158,611 | 3/1939 | Wickersham | 305/125 |
| 3,168,929 | 2/1965 | Wardle | 180/9.1 X |
| 4,519,654 | 5/1985 | Satzler et al. | 305/27 |
| 4,681,177 | 7/1987 | Zborowski | 180/9.56 |
| 5,279,378 | 1/1994 | Grawey et al. | 180/9.21 |
| 5,316,381 | 5/1994 | Isaacson et al. | 305/10 |
| 5,409,075 | 4/1995 | Nieman | 180/9.5 |

FOREIGN PATENT DOCUMENTS

| | | | |
|---|---|---|---|
| 82/01693 | 5/1982 | WIPO . | |
| 89/05739 | 6/1989 | WIPO . | |
| 93/11021 | 6/1993 | WIPO | 305/126 |

*Primary Examiner*—Anne Marie Boehler
*Attorney, Agent, or Firm*—O. Gordon Pence

[57] ABSTRACT

A heavy duty belt laying work machine includes a frame, a driver wheel mounted in supporting relation to the frame on each lateral side thereof, an idler wheel assembly disposed on each lateral side of the frame. The idler wheel assembly includes an idler wheel and a carry-roller, each of which is rotatably connected to an idler support arm that is pivotally mounted in supporting relation to the frame. A mid-roller is disposed on each lateral side of the frame between the driver wheel and the idler wheel assembly and rotatably connected to a mid-roller support arm mounted in supporting relation to the frame. An endless, inextensible belt is entrained about each respective idler wheel and driver wheel on each lateral side of the frame and contacts the mid-roller and the carry-roller. Apparatus are provided for controllably tensioning and urging each belt into frictional driven engagement with a corresponding one of the driver wheels.

3 Claims, 2 Drawing Sheets

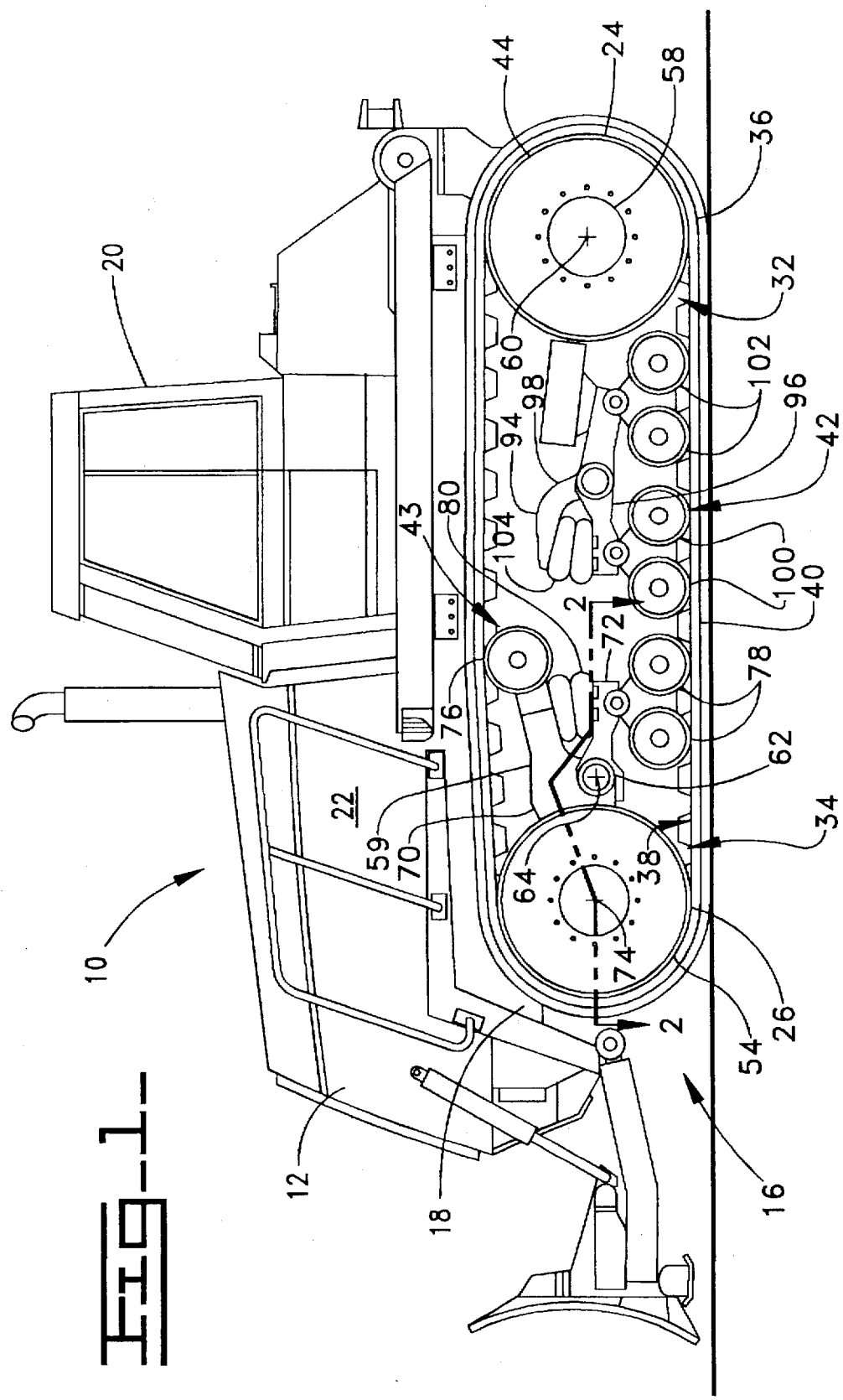
Fig_1

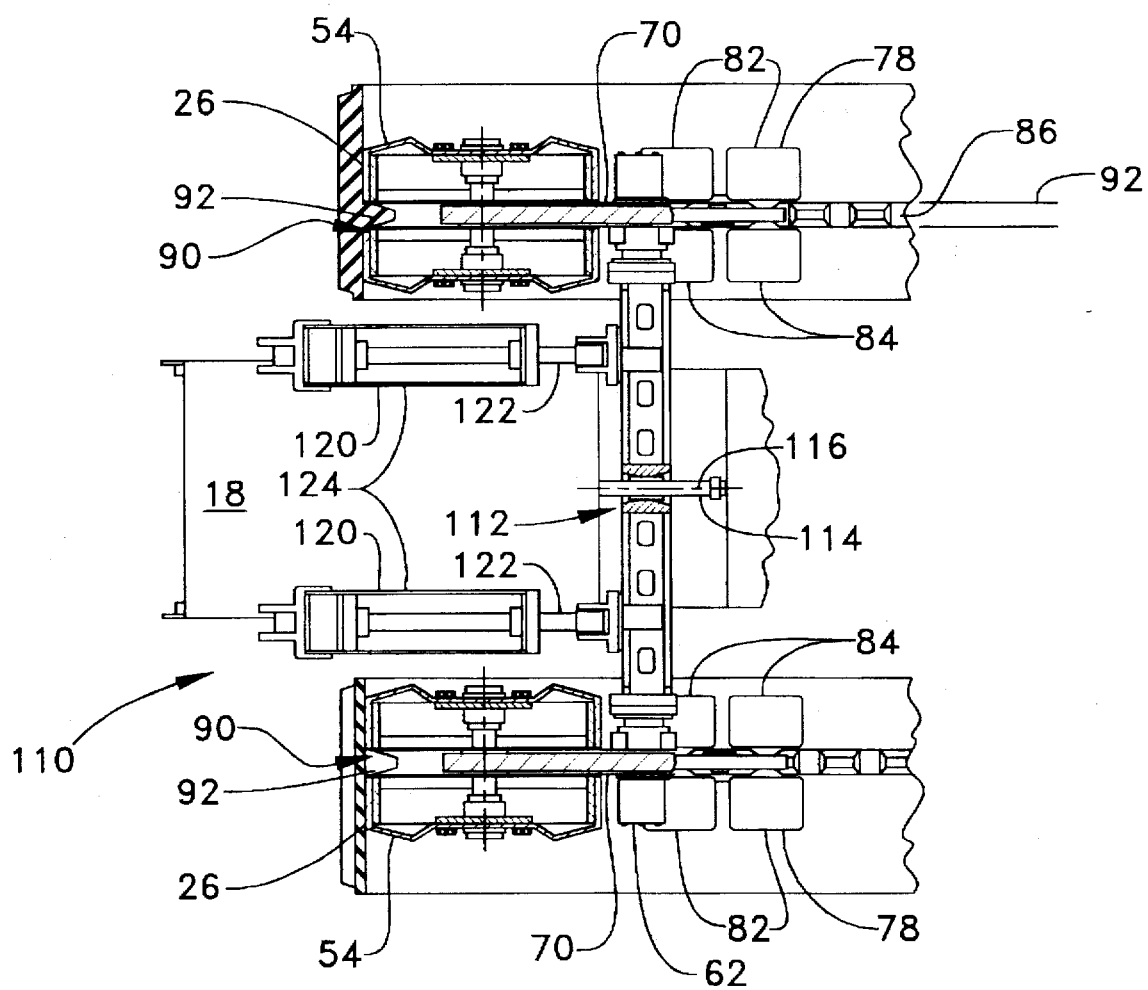

BELTED WORK MACHINE

TECHNICAL FIELD

The present invention relates generally to crawler-type machines, tractors or equipment having tracks over wheels for providing both ground support and tractive effort and, more particularly, to an undercarriage for such machinery which provides a smooth ride over rough terrain.

BACKGROUND OF THE INVENTION

Belt laying machines are known which include a wheel and track propulsion system having a continuous rubber belt entrained about a pair of wheels. One example of such a propulsion system is disclosed in U.S. Pat. No. 5,279,378 issuing to Grawey et al. on Jan. 18, 1994, the contents of which are hereby incorporated by reference. In U.S. Pat. No. 5,279,378, an elastomeric belt is highly tensioned about a pair of wheels to provide frictional engagement with one or more of the wheels. Interposed between the wheels is a roller support system for distributing a portion of the weight and load imposed on the machine frame to the belt. The roller support system includes a mounting structure which is pivotally connected to the machine frame and, therefore, free to rotate relative to the machine frame to accommodate undulations in the terrain surface while maintaining uniform ground pressure.

While the machine and undercarriage of U.S. Pat. No. 5,279,378 successfully performs to fully meet one of its intended purposes (namely providing a smooth ride for the operator in most soil conditions and topography from level land to steep inclinations while performing useful work without breaking the belts, losing drive capability between engaged wheels and belts, or disengaging the belts from the wheels), there nevertheless may be extreme operating conditions under which operation of the machine and undercarriage is not intended and, therefore, an improved undercarriage is desired. For example, in high speed arctic crossings, an improved undercarriage is desired for a smooth ride over glacial and/or otherwise unimproved arctic surfaces. In such an environment, the machine and undercarriage must be capable of traversing ice rifts and ridges and of providing a smooth ride over rough, exposed windswept surfaces as well as over frozen drifts of snow. The present invention is directed at providing an improved undercarriage which provides a smooth ride in such extreme conditions, as well as improving the overall tractive capability.

DISCLOSURE OF THE INVENTION

According to one embodiment of the present invention, an undercarriage for a heavy duty belt laying work machine has a driver wheel, an idler wheel longitudinally spaced from the driver wheel, a mid-roller and an endless, inextensible belt entrained about the driver wheel, the idler wheel and the mid-roller. The driver wheel is adapted for drivingly engaging the belt. The undercarriage includes an idler support system having an idler support arm, a mid-roller support arm and a carry-roller. Each of the support arms are separately pivotally mounted to an axle for pivotal movement relative to each other. The idler support arm has the idler wheel rotatably mounted to a leading portion thereof and the carry-roller rotatably mounted to a trailing portion thereof with the axle being located between the idler wheel and carry-roller. The mid-roller support arm has the mid-roller rotatably mounted thereto. A forward force reaction structure is disposed between the idler support arm and the mid-roller support arm. The forward force reaction structure is adapted to bias the idler support arm against the mid-roller support arm.

According to another embodiment of the present invention, a heavy duty belt laying work machine includes a frame having opposed lateral sides, a driver wheel mounted in supporting relation to the frame on each lateral side thereof, and an idler support system disposed on each lateral side of the frame. The idler support system includes an idler wheel, and idler support arm and a carry-roller. The idler wheel and carry-roller are each rotatably mounted on the idler support arm with the idler support arm being pivotally mounted to the machine frame. The work machine further includes a mid-roller support arm which is pivotally mounted to the frame and a pair of mid-rollers which are rotatably mounted to the mid-roller support arm. The mid-rollers are disposed between the driver wheel and the idler support system. A force reaction structure is located between the idler support arm and the mid-roller support arm for biasing the idler support arm against the mid-roller support arm. Means are provided for rotating each of the driver wheels. An endless, inextensible belt is entrained about each respective idler wheel and driver wheel on each lateral side of the frame and contacts the carry-roller and the mid-roller. Means are also provided for controllably tensioning and urging each belt into frictional driven engagement with a corresponding one of the driver wheels. The carry-roller and the mid-roller are each arranged in a contacting relation to the endless, inextensible belt when the belt is entrained about the idler wheel and the driver wheel such that when an external force is applied on the idler wheel through the belt, the external force on the idler wheel is transmitted to the mid-roller from the idler support arm through the forward force reaction structure to the mid-roller support arm, and when an external force is applied on the mid-roller through the belt, the external force on the mid-roller is transmitted to one of the idler wheels and carry-roller from the mid-roller support arm through the forward force reaction structure to the idler support arm.

BRIEF DESCRIPTION OF THE DRAWINGS

FIG. 1 is a side elevational view of a heavy duty belt laying machine according to one embodiment of the present invention.

FIG. 2 is a top, cross-sectional view taken in the direction of the arrows indicated along line 2—2 of FIG. 1.

BEST MODE FOR CARRYING OUT THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1 and 2, a heavy duty belt laying work machine 10 is shown having a chassis 12 and a propulsion system 16 which resides generally beneath and in supporting relation to a frame 18. Frame 18 together with an operator's station 20 and an engine 22 constitute the chassis 12. The propulsion system 16 includes two pairs of longitudinally spaced apart wheel structures 24,26 which are arranged on opposite lateral sides of the machine chassis 12 and have respective radially outwardly facing peripheral surfaces 32,34. A pair of endless, substantially inextensible belts 36 each have an interior 38 and an exterior 40 surface which are respectively engaged with the wheels' outer peripheral surfaces 32,34 and the underlying terrain. The endless characteristic of the belt 36 means that the belt is continuous and has no connection joints. A mid-roller support system 42 is joined to frame 18 on each lateral side of the chassis 12 and is engageable with each belt's interior surface 38 longitudinally between the separated wheel structures 24,26. Similarly, an idler support system 43 is joined to frame 18 on each lateral side of the chassis 12 and is engageable with each belt's interior surface 38. However, unlike mid-roller support system 42 which is separate from wheel structures 24,26, idler support system 43 supports wheel 26 as discussed hereinafter in greater detail.

Inasmuch as the propulsion system 16 has substantially identical components on each lateral side of the chassis 12, further reference will only be made to the set of components shown at one side of the machine in FIG. 1. At least one of the wheel structures on each lateral side of the chassis 12 constitutes a driver wheel 44 which frictionally transmits power to the belt 36 from the chassis-mounted engine 22. In the illustrated embodiment, the other wheel structure includes an idler wheel 54 which, as part of and together with idler support system 43, helps to support the machine chassis 12, cooperates with the driver wheel 44 to provide a path along which the belt 36 can be driven, and, more importantly, provides increased recoil capability over that of the idler wheel disclosed in U.S. Pat. No. 5,279,378 in order to provide a smooth ride and increase tractive effort in extreme operating conditions. It should be understood that the front wheel structure 26 could alternately be the driver, with the understanding that the idler support system 43 would be relocated to the rear of the machine in place of driver wheel 44 and include the idler wheel 54.

In the specific preferred embodiment, the rear wheel structure 24 constitutes the driver wheel 44 and the front wheel structure 26 constitutes the idler wheel 54. Similar to the driver wheel of U.S. Pat. No. 5,279,378, the driver wheel 44 is mounted on a laterally protruding axle 58 so as to rotate about the axle's axis 60 during machine operation. However, the idler wheel 54 is mounted to an idler support structure 59 which in turn is mounted to axle 62 so as to pivot about axis 64 during machine operation. The specific construction of the driver wheel 44 and the idler wheel 54 is that of the driver and idler wheel described in U.S. Pat. No. 5,279,378 hereby incorporated by reference.

The idler support structure 59 includes an idler support arm 70 and a separate first mid-roller support arm 72, each of which are separtely pivotally mounted to axle 62. Idler wheel 54 is rotatably mounted to the leading portion of idler support arm 70 and, therefore, rotates about its own axis 74 while freely pivoting about axis 64 defined by forward axle 62. As such, idler wheel 54 is able to follow rough terrain more freely than a fixed wheel and axle assembly. A carry-roller 76 is rotatably mounted to the trailing portion of idler support arm 70 and, like idler wheel 54, pivots with about axis 62 as well. A first pair of mid-rollers 78 are mounted to first mid-roller support arm 72. First mid-roller support arm 72 is biased against idler support arm 70 by a forward force reaction structure 80. In the specific preferred embodiment, biasing structure 80 includes a resilient structure such as a set of rubber springs or an inflatable air bag arranged between the idler support arm 70 and the first mid-roller support arm 72.

In operation, carry-roller 76 and belt 36 provide damping for idler support system 43. Carry-roller 76 is biased against first mid-roller support arm 72 by the forward force reaction structure 80 so as to react forces transmitted to it by mid-rollers 78 against the belt 36. As such, belt 36 serves as a damping member for the idler support system 42 by first resiliently reacting forces transmitted to it by carry-roller 76. Alternately, carry-roller 76 could be eliminated and idler support arm 70 could be reacted against frame 18 through a conventional damping member such as a shock absorber.

As shown in FIG. 2, each mid-roller 78, as well as the carry-roller 76, has a pair of laterally separated roller elements 82,84 respectively, which are rollingly engaged with the belt's interior surface 38. The separation distance between laterally adjacent roller elements 82,84 constitutes a guide slot 86,88, which is laterally aligned with the corresponding circumferential guide channel 90 of the idler wheel 54 and driver wheel 44. The belts' associated guide structures 92 longitudinally traverse the guide path formed by the idler and driver wheels' circumferential guide channels 90 and the carry and mid-rollers' guide slots 86. By virtue of the guide structures' 92 residence in the guide slots 86 and channels 90, lateral registry of the belt 36 with the associated wheels 44,54, carry-roller 76 and mid-rollers 78 is assured.

Similar to the roller support system disclosed in U.S. Pat. No. 5,279,378, roller support system 42 includes second and third mid-roller support arms 94,96 pivotally mounted to frame 18 at mounting location 98. A second pair of mid-rollers 100 and a third pair of mid-rollers 102 are rotatably mounted to support arms 96,94, respectively. A rear force reaction structure 104 biases one of the support arms 94,96 increasingly toward the belt's interior surface 38 in response to the belt's interior surface 38 being increasingly biased toward the other support arm 94,96. The rear force reaction biasing structure 104 includes a resilient structure such as a set of rubber springs or inflatable air bags arranged between the support arms. Each of the mid-rollers 100,102 includes a pair of laterally separated roller elements (not shown, but similar to roller elements 82,84 described above), which are rollingly engaged with the belt's interior surface 38. The separation distance between such laterally adjacent roller elements constitutes a guide slot (not shown) which is laterally aligned with the associated circumferential guide channels 90 of the idler support system 43 and the driver wheel 44.

Similar to that described in prior incorporated U.S. Pat. No. 5,279,378, means for controllably tensioning and urging belt 36 into frictional driven engagement with driver wheel 44 is provided by a recoil/tensioning apparatus 110. The front axle 62 of machine 10 is pivotally mounted on the frame 18 through a sliding spherical bearing 112 about a pivot pin 114 which defines a longitudinal pivot axis 116 which is parallel to the chassis' longitudinal axis. A pair of spring and/or hydraulic cylinders 120 each have a rod end 122 and a head end 124 which are respectively connected to axle 62 and frame 18. Cylinders 120 maintain tension on axle 62 in order to maintain a constant belt tension. In particular, cylinders 120 are adjustable via spring/hydraulic pressure to adjust axle 62 along pin 116 and provide the desired engagement pressure between belt 36 and driver wheel 44. The above-described tensioning apparatus 110 is beneficial to provide the desired engagement pressure, for example, where the wheel structures and/or axles cannot be accurately located or where the inextensible belt 36 cannot be installed or removed from the entrained wheel structures 24,26.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For example, other benefits of the preferred embodiment shown herein include an overall more balanced belt laying machine. During high speed operation of machine 10 over rough terrain, the forces transmitted to the undercarriage are greater than those otherwise transmitted in lower speed, smooth terrain applications. By virtue of the idler support system 43 having the idler wheel 54 mounted forward of the front axle 62, the center of gravity of the undercarriage is more aligned with the center of gravity of machine 10. In particular, the center of gravity of the undercarriage is moved forward toward the engine 22 of the machine 10. As such, forces transmitted to the undercarriage tend to merely rotate the undercarriage about its center of gravity and tend to not be transmitted to the machine 10, thereby minimizing fore and aft pitching of the machine 10. Additionally, the damping provided by belt 36 via the action of the idler support assembly 43 tends to minimize pitch and roll of the machine 10. The resulting machine operation and ride transmitted to the operator is therefore improved in the present invention.

Another benefit of increasing the overall track length of the machine 10 by extending the idler wheel 54 forward of axle 62 in the manner shown herein is an improved terrain crossing ability. For example, machine 10 is capable of crossing wider ice fissures than would otherwise be possible by mounting the idler wheel at axle 62.

Another benefit of increasing the overall track length of the machine 10 is an improved overall tractive effort. By increasing the track length and maintaining the overall machine length and weight, the machine tractive capability is increased to permit additional load pulling.

What is claimed is:

1. In an undercarriage for a heavy duty belt laying work machine, said undercarriage including a driver wheel, an idler wheel longitudinally spaced from said driver wheel, a mid-roller and an inextensible belt, said belt being entrained about said driver wheel, said idler wheel and said mid-roller, said driver wheel being adapted for drivingly engaging said belt, said undercarriage comprising:

an idler support system having an idler support arm, a mid-roller support arm and a carry-roller, each of such support arms being separately pivotally mounted to an axle, said idler support arm having said idler wheel rotatably mounted to a leading portion thereof and said carry-roller rotatably mounted to a trailing portion thereof with said axle being located between said idler wheel and said carry-roller, said mid-roller support arm having said mid-roller rotatably mounted thereto; and a forward force reaction structure disposed between said idler support arm and said mid-roller support arm adapted to bias said idler support arm against said mid-roller support arm.

2. The undercarriage of claim 1,
wherein said carry-roller and said mid-roller are each arranged in a contacting relation to said endless, inextensible belt when said belt is entrained about said idler wheel and said driver wheel such that when an external force is applied on said idler wheel through said belt, said external force on the idler wheel is transmitted to said mid-roller from said idler support arm through said forward force reaction structure to said mid-roller support arm, and when an external force is applied on said mid-roller through said belt, said external force on said mid-roller is transmitted to one of said idler wheel and carry-roller from said mid-roller support arm through said forward force reaction structure to said idler support arm.

3. A heavy duty belt laying work vehicle, comprising:

a frame having opposed lateral sides;

a driver wheel mounted in supporting relation to said frame on each lateral side thereof;

an idler support system disposed on each lateral side of said frame and including an idler wheel, an idler support arm and a carry-roller, said idler support arm having said idler wheel rotatable mounted to a leading portion thereof and said carry-roller rotatable mounted to a trailing portion thereof and being pivotally mounted to said frame by an axle at a location between said idler wheel and said carry-roller;

a mid-roller support arm pivotally mounted to said frame by said axle;

a pair of mid-rollers rotatable mounted to said mid-roller support arm, said mid-rollers being disposed between said driver wheel and said idler support system;

a forward force reaction structure located between said idler support arm and said mid-roller support arm for biasing said idler support arm against said mid-roller support arm;

means for rotating each of said driver wheels;

an endless, inextensible belt entrained about each respective idler wheel and driver wheel on each lateral side of said frame and contacting said carry-roller and said mid-roller;

means for controllably tensioning and urging each belt into frictional driven engagement with a corresponding one of said driver wheels; and said carry-roller and said mid-roller each being arranged in a contacting relation to said endless, inextensible belt when said belt is entrained about said idler wheel and said driver wheel such that when an external force is applied on said idler wheel through said belt, said external force on the idler wheel is transmitted to said mid-roller from said idler support arm through said forward force reaction structure to said mid-roller support arm, and when an external force is applied on said mid-roller through said belt, said external force on said mid-roller is transmitted to one of said idler wheel and carry-roller from said mid-roller support arm through said forward force reaction structure to said idler support arm.

* * * * *